No. 704,834. Patented July 15, 1902.
G. W. & J. C. JONES.
FIRE ESCAPE.
(Application filed Dec. 31, 1901.)
(No Model.)

Witnesses
T. P. Britt
Harry E. Ellis Chandler

Inventors:
G. W. Jones,
J. C. Jones,
By Chandler & Chandler
Attorneys

THE NORRIS PETERS CO., PHOTO-LITHO., WASHINGTON, D. C.

UNITED STATES PATENT OFFICE.

GEORGE W. JONES AND JAMES C. JONES, OF SCOTLAND, ARKANSAS.

FIRE-ESCAPE.

SPECIFICATION forming part of Letters Patent No. 704,834, dated July 15, 1902.

Application filed December 31, 1901. Serial No. 87,944. (No model.)

*To all whom it may concern:*

Be it known that we, GEORGE W. JONES and JAMES C. JONES, citizens of the United States, residing at Scotland, in the county of Van Buren, State of Arkansas, have invented certain new and useful Improvements in Fire-Escapes; and we do hereby declare the following to be a full, clear, and exact description of the invention, such as will enable others skilled in the art to which it appertains to make and use the same.

This invention relates to fire-escapes; and it has for its object to provide a construction which will be simple and cheap of manufacture, which may be readily attached to any building, and which may be quickly and easily operated to raise the baskets and to lower them with their occupants.

Figure 1:
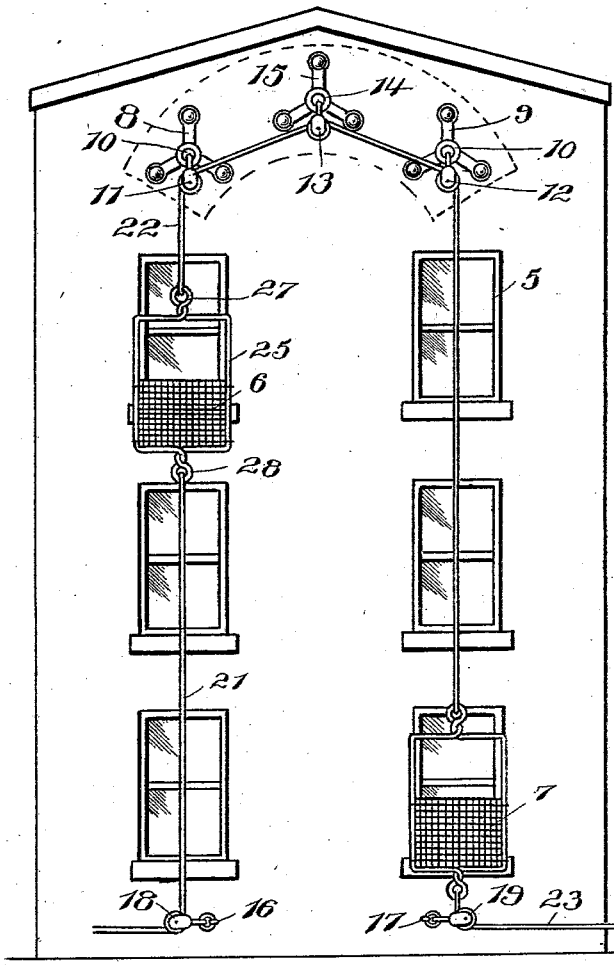
Figure 2:
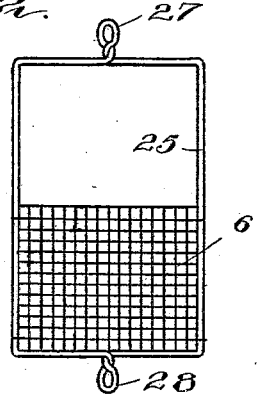
Figure 3:
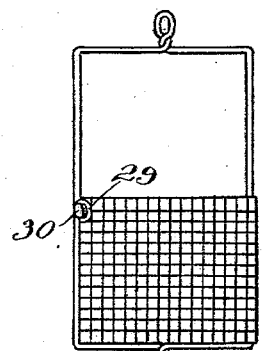

In the drawings forming a portion of the specification, and in which like numerals of reference indicate similar parts in the several views, Figure 1 is an elevation showing a building with the apparatus in place. Fig. 2 is an elevation of one of the baskets, the bails being in perspective. Fig. 3 is a view similar to Fig. 2 and showing a second form of basket.

Referring now to the drawings, there is shown a building having windows 5, in line with which the baskets 6 and 7 are to be raised and lowered. Above the windows are fixed the two tripods 8 and 9, having eyes 10 at their outer end for engagement by the hooks of pulleys 11 and 12, a third pulley 13 being engaged with an eye 14 of a tripod 15, which is secured to the front of the building above the first tripods and equidistant therefrom. At the base of the building and below the tripods 8 and 9 are engaged the irons 16 and 17, having rings at their outer ends, in which are engaged the hooks of pulleys 18 and 19. A cable 20 is engaged with the pulley 18 and is taken upwardly and through the three upper pulleys in succession and then downwardly and around the pulley 19, the cable consisting of three sections 21, 22, and 23, of which the section 21 is attached to the bottom of one basket 6, the section 23 being attached to the bottom of the basket 7, and the section 22 being attached to the tops of the two baskets and passed over the upper pulleys. Each of the baskets consists of a body portion of metal, preferably woven, and to which is attached a bail 25, consisting of a bar of iron, which is endless and is passed in a vertical plane around the basket, the lower portion of the bail lying against the bottom of the basket, while the sides of the bail pass upwardly of the sides and over the top of the basket. At the uppermost point of the bail the bar of iron of which it is formed is twisted to form an eye 27, while the central portion of the bottom of the bail is likewise twisted to form an eye 28, these eyes providing means for attachment of the cables thereto.

In Fig. 3 of the drawings is shown a modification of the basket wherein the bail has eyes formed therein at 29 by suitably bending the metal of the bail and in which eyes are engaged the trunnions 30 at diametrically opposite points of the upper edge of the basket, so that in the event of it becoming necessary to draw the basket outwardly from the wall of the building the body of the basket will hang vertical, although the bail might be inclined.

What is claimed is—

1. A fire-escape comprising tripods adapted for attachment to the upper portion of a building above the windows having pulleys engaged therewith, additional pulleys adapted for attachment to the base of the building below the windows, a cable engaged with the first-named pulleys, baskets with which the ends of the said cable are engaged, and additional cables attached to the under sides of the baskets and passed around the second-named pulleys.

2. A fire-escape comprising a bail formed of an endless bar of metal including a bottom, sides and top, the sides being bent to form bearings, and the bottom and top being bent to form eyes, and a metal basket having trunnions at its upper edge pivotally engaged with the bearings, the upper and lower eyes being adapted for attachment of cables thereto.

In testimony whereof we hereunto sign our names, in the presence of two subscribing witnesses, on the 10th day of December, 1901.

GEORGE W. JONES.
JAMES C. JONES.

Witnesses:
 LUSTER DEON,
 PERY COPLAND.